United States Patent
Vigeant et al.

(10) Patent No.: US 7,556,282 B2
(45) Date of Patent: Jul. 7, 2009

(54) STEERING WHEEL ASSEMBLY

(75) Inventors: Peter L. Vigeant, Troy, MI (US); Jesse A. Sheldon, Taylor, MI (US); Steven R. Zofchak, Fenton, MI (US); Michael J. Olesko, Ann Arbor, MI (US); Bryan H. Stover, Troy, MI (US)

(73) Assignee: Toyoda Gosei Co. Ltd., Gun-Aichi (JP)

( * ) Notice: Subject to any disclaimer, the term of this patent is extended or adjusted under 35 U.S.C. 154(b) by 195 days.

(21) Appl. No.: 11/371,478

(22) Filed: Mar. 9, 2006

(65) Prior Publication Data

US 2007/0210562 A1    Sep. 13, 2007

(51) Int. Cl.
*B60R 21/16*    (2006.01)
(52) U.S. Cl. .................. 280/728.2; 280/731
(58) Field of Classification Search ............. 280/728.1, 280/728.2, 728.3, 731; 200/61.54, 61.55
See application file for complete search history.

(56) References Cited

U.S. PATENT DOCUMENTS

| | | | |
|---|---|---|---|
| 6,325,408 B1 | 12/2001 | Ford | |
| 6,554,312 B2 | 4/2003 | Sakane et al. | |
| 6,568,702 B1* | 5/2003 | Ford | 280/728.2 |
| 7,059,631 B2* | 6/2006 | Schorle et al. | 280/731 |
| 7,159,897 B2* | 1/2007 | Worrell et al. | 280/731 |
| 2003/0173759 A1* | 9/2003 | Grenier | 280/728.2 |
| 2004/0217580 A1* | 11/2004 | Schorle et al. | 280/731 |
| 2005/0017484 A1* | 1/2005 | Worrell et al. | 280/731 |
| 2005/0023804 A1* | 2/2005 | Hauer et al. | 280/728.3 |
| 2006/0208470 A1* | 9/2006 | Tsujimoto et al. | 280/731 |

* cited by examiner

*Primary Examiner*—Paul N. Dickson
*Assistant Examiner*—Robert A. Coker
(74) *Attorney, Agent, or Firm*—Carlson, Gaskey & Olds

(57) ABSTRACT

A steering wheel assembly includes a bracket and a spring. At least one arm of the spring is inserted through a first aperture and a second aperture. The arm extends across a hole for receiving a connection pin of an airbag module. The spring retains itself on the bracket without the need for separate fasteners. In the disclosed embodiment, the spring is U-shaped and includes two such arms, each extending through one of a pair of first apertures and one of a pair of second apertures, each arm extending across one of a pair of holes for receiving a connection pin.

21 Claims, 5 Drawing Sheets

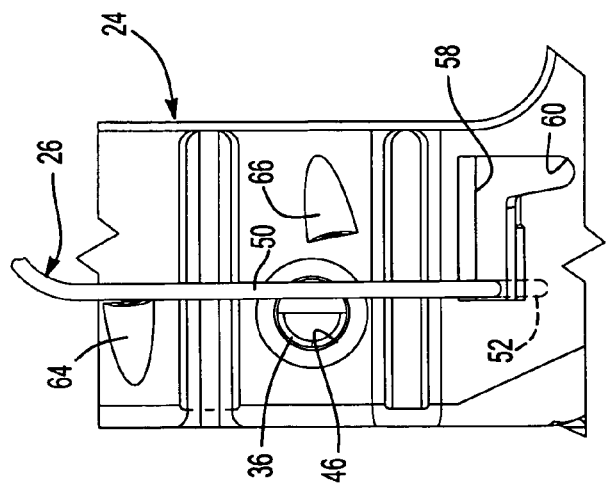
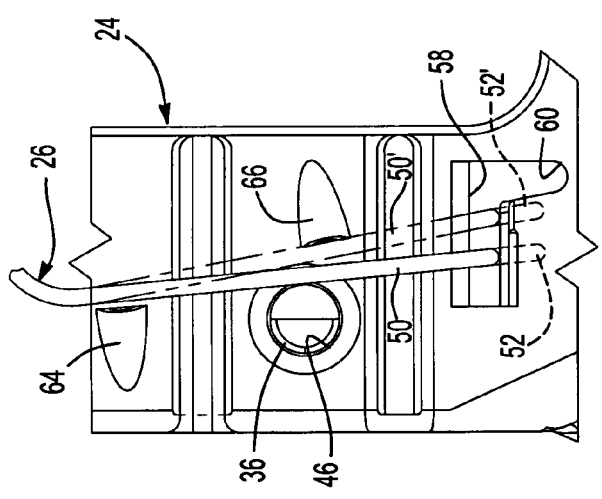
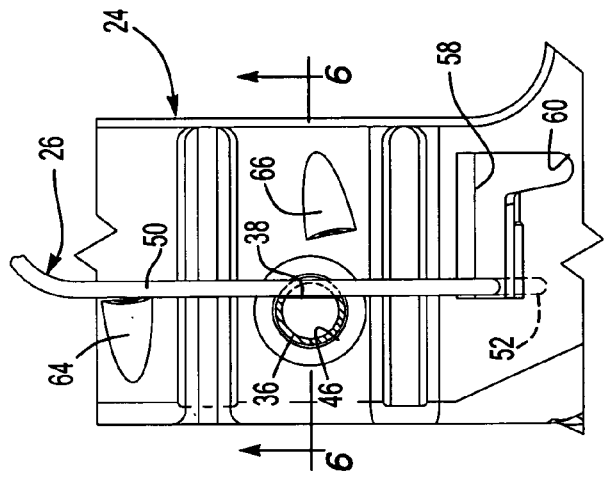
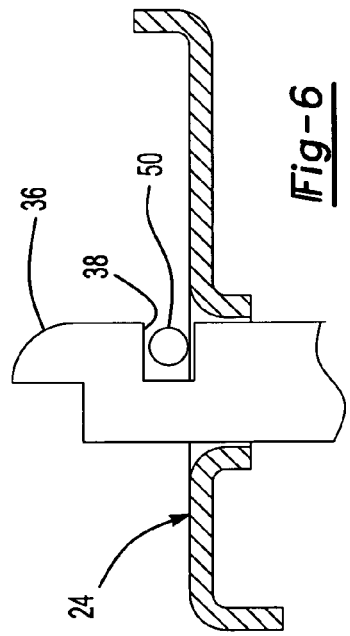

STEERING WHEEL ASSEMBLY

BACKGROUND OF THE INVENTION

The present invention relates generally to a steering wheel assembly for connecting an airbag module to a steering wheel.

In some steering wheels, the air bag module is connected to a horn bracket by way of a series of connection pins. Each of the pins includes a slot near one end which is used to engage a wire spring fixed to the horn bracket. In the known assemblies, either two independent springs are used or a single spring is used. In either arrangement, each spring is attached to the horn bracket by a fastener such as a screw or a plastic housing. The use of such fasteners increases cost and complicates assembly. In addition, the use of such fasteners may have an impact on the overall integrity of the horn bracket assembly in the event that one or both of the fasteners are loosened.

For example, in U.S. Pat. No. 6,554,312, the spring is held by an additional plastic holding member. The holding member is then attached to the core of the steering wheel.

SUMMARY OF THE INVENTION

The present invention eliminates the need for additional fasteners and improves the connection of the airbag module in the steering wheel assembly. According to the present invention, the spring is fitted to the horn bracket by an arrangement of apertures and stops formed integrally with the bracket, thus eliminating entirely reliance upon mechanical fasteners.

In a preferred embodiment, the spring is U-shaped and includes two arms extending from a cross-bar. Each arm is inserted in a first direction through one of a pair of first apertures through the bracket and then back through the bracket through one of a pair of second apertures. The resiliency of the spring and the arrangement of the apertures retains the spring on the bracket without additional fasteners.

Each of the arms extends over a hole through the bracket. The airbag module includes a pair of connection pins, each having a slot. Upon insertion of the connection pins through the holes in the bracket, the arms of the spring snap into the slots on the connection pins, thereby connecting the airbag module to the bracket.

BRIEF DESCRIPTION OF THE DRAWINGS

Other advantages of the present invention can be understood by reference to the following detailed description when considered in connection with the accompanying drawings wherein:

FIG. 5A is a view, similar to FIG. 3A, showing the first step of inserting a connection pin into the horn bracket.

FIG. 5B shows the second step of inserting a connection pin into the horn bracket.

FIG. 5C shows the third step of inserting a connection pin into the horn bracket.

FIG. 6 is a section view taken along line 6-6 of FIG. 5C.

DETAILED DESCRIPTION OF THE PREFERRED EMBODIMENTS

Figure 1:
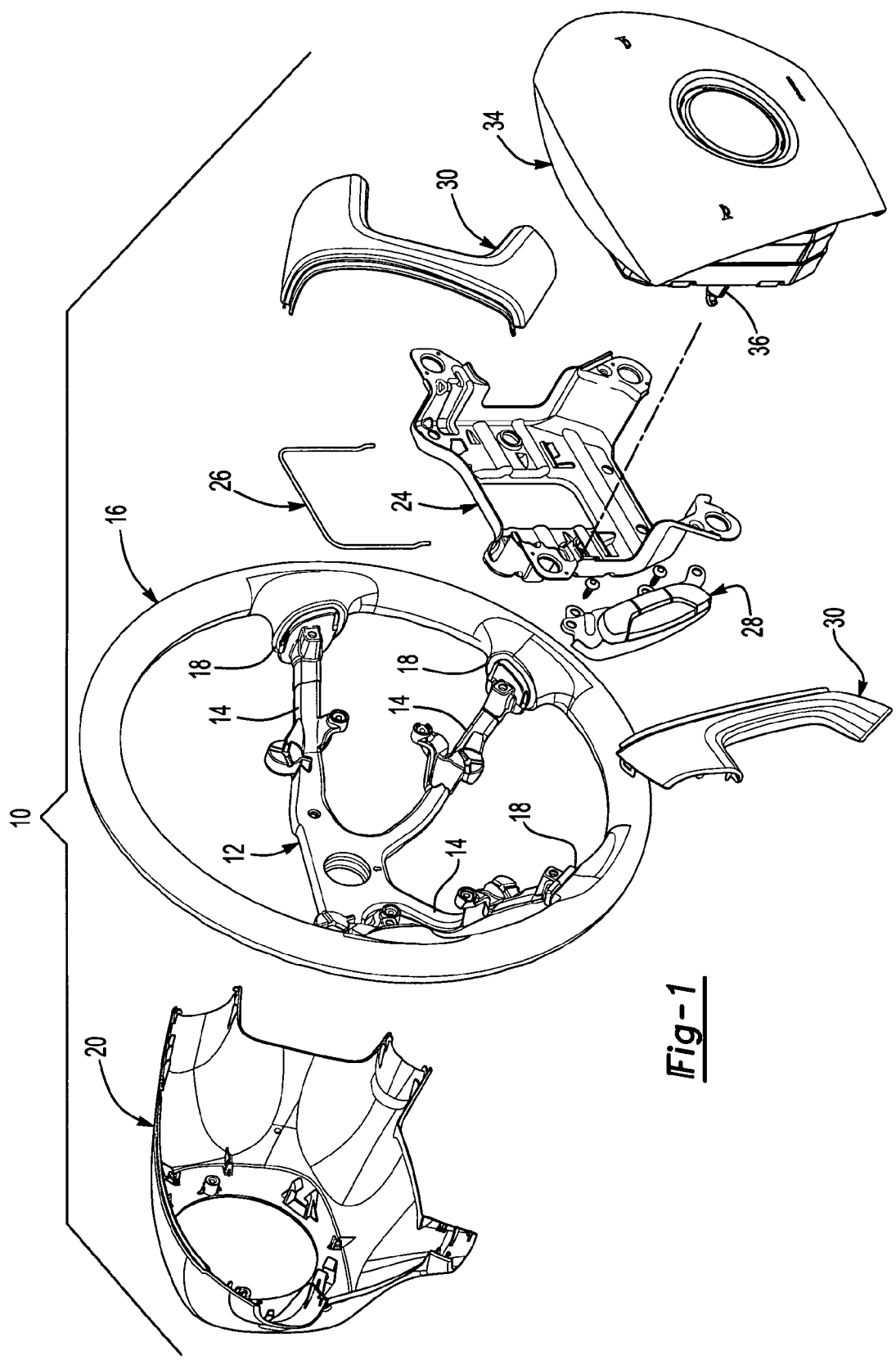
FIG. 1 is an exploded view of a steering wheel assembly according to the present invention.

A steering wheel assembly 10 according to the present invention is shown in FIG. 1. The steering wheel assembly 10 includes a metal armature 12 having radially extending spokes 14. A urethane covering layer 16 includes integrally molded spoke ends 18 extending radially inwardly, each overmolded over one of the spokes 14 of the armature 12.

The steering wheel assembly 10 further includes a molded plastic back cover 20. A stamped metal horn bracket 24 has associated therewith a spring 26 for connecting the horn bracket 24 to an airbag module 34 having a pair of connection pins 36 (one shown in FIG. 1). An optional electrical switch assembly 28 can be included to control in-vehicle entertainment, climate control or cruise control, etc. A pair of plastic trim plates (or bezels) 30 may be fitted to cover portions of the horn bracket 24 and armature 12.

Figure 2:
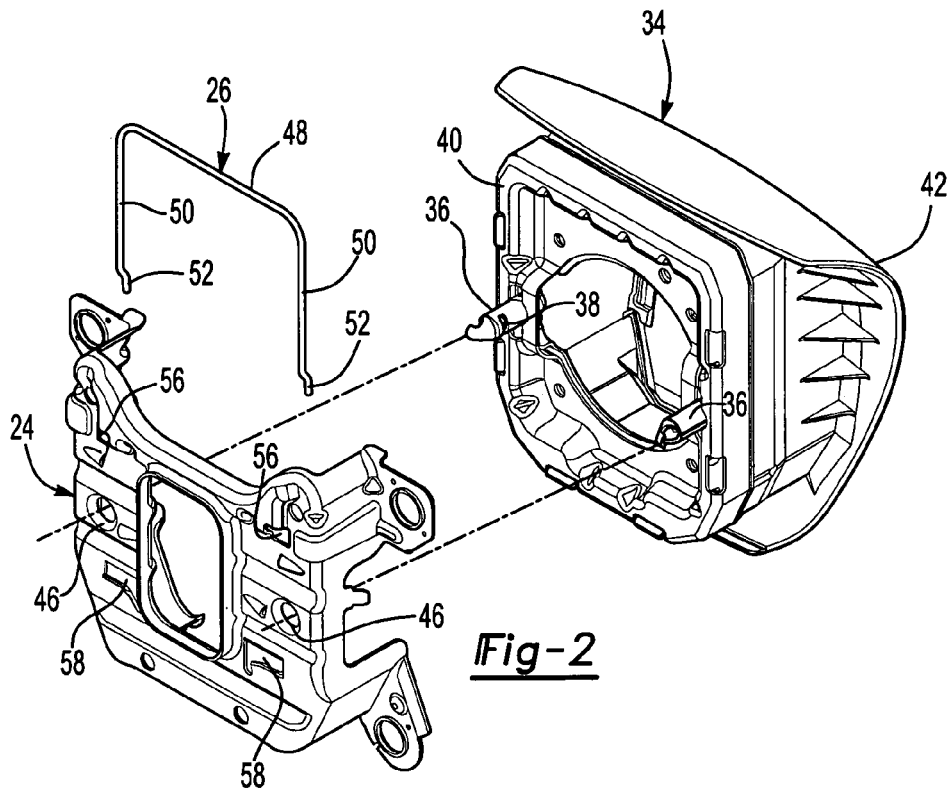
FIG. 2 is an exploded, rear perspective view of the airbag module, horn bracket and spring of FIG. 1.

FIG. 2 is an exploded, rear perspective view of the airbag module 34, horn bracket 24 and spring 26 of FIG. 1. The airbag module 34 includes an inflator housing 40 secured to an airbag cover 42 and may include an airbag and horn switch (not shown). The inflator housing 40 is stamped sheet metal and may include integral connection pins 36 having slots 38 (only one is visible in FIG. 2) formed in sides of the connection pins 36. The horn bracket 24 includes a pair of holes 46 therethrough for receiving the connection pins 36 of the airbag module 34. The spring 26 is generally U-shaped, although other shapes could be used, and includes a crossbar 48 connecting two arms 50. Each arm 50 has an offset free end 52 extending generally parallel to its associated arm 50 and offset to a plane generally parallel to both arms 50.

Figure 3:
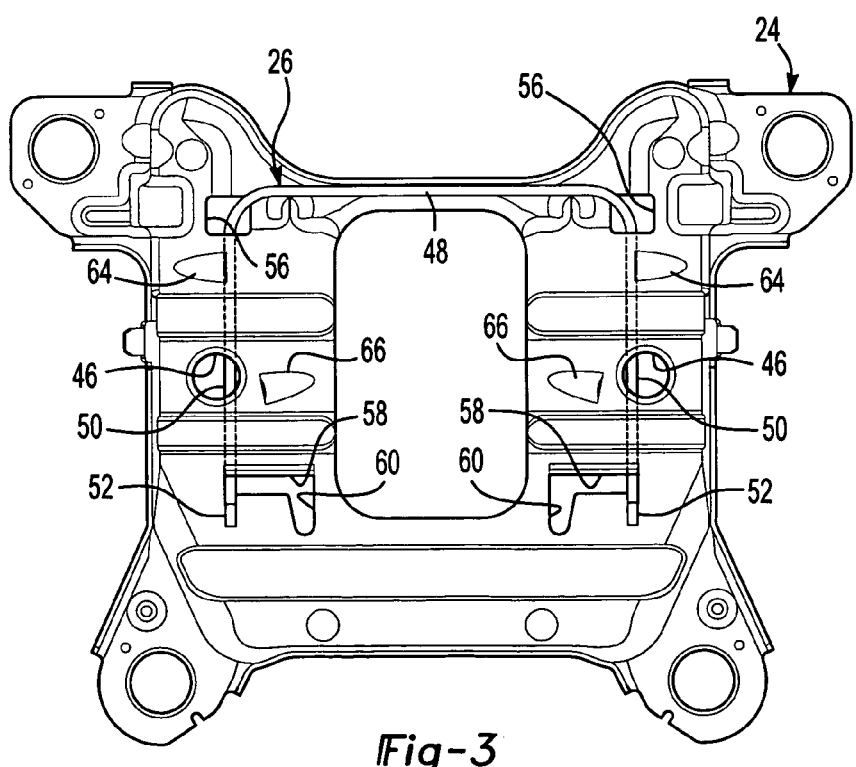
FIG. 3 is a front view of the assembled horn bracket assembly.

FIG. 3 is a front view of the assembled horn bracket 24 and spring 26. The horn bracket 24 shown is a stamped sheet metal bracket, but the spring 26 could be attached to other types of brackets as well using an attachment method similar to that described herein. The horn bracket 24 includes a pair of "upper" or first apertures 56 therethrough near an upper edge and a pair of "lower" or second apertures 58 therethrough toward a lower edge ("upper" and "lower" referring only to the orientation in FIG. 3). The second apertures 58 each include an inner flag portion 60 having increased dimension. Each hole 46 (for receiving the connection pins 36 of the airbag module 34) is substantially between one of the first apertures 56 and one of the second apertures 58. A pair of first stops 64 are formed by lancing the horn bracket 24 at positions outward of both arms 50 of the spring 26. A pair of second stops 66 are formed by lancing the horn bracket 24 at positions inward of the arms 50 of the spring 26.

Figure 3A:
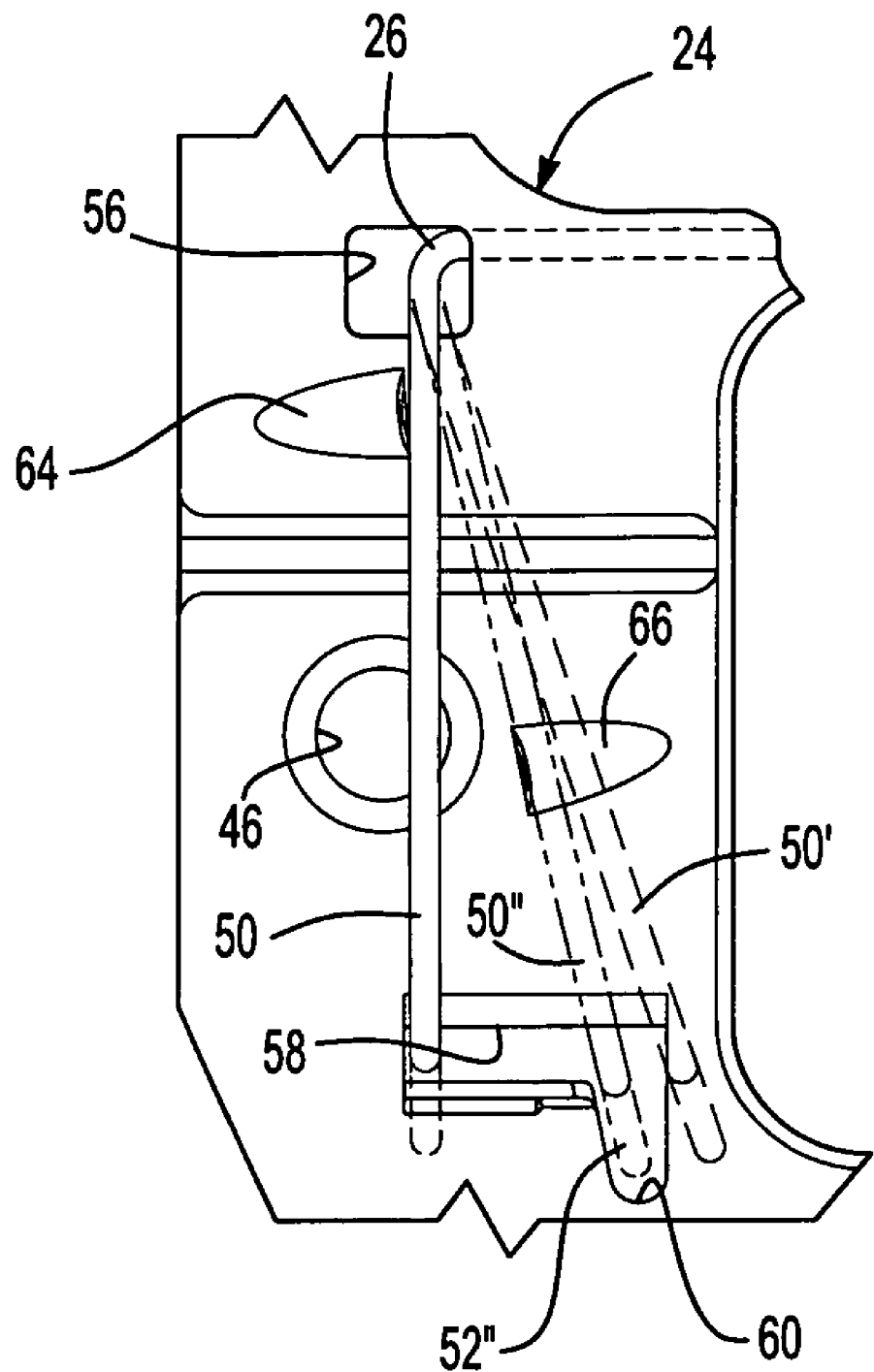
FIG. 3A an enlarged rear view of one of the arms as the spring is being installed onto the horn bracket.

Assembly of the spring 26 into the horn bracket 24 is demonstrated in FIG. 3A, which is an enlarged rear view of a portion of FIG. 3 (one arm 50 of the spring 26 shown). The ends 52 of the arms 50 of the spring 26 are inserted rearwardly through the first apertures 56, deformed slightly inwardly toward one another to the position shown as arm 50', where the arm 50' is on the second stop 66. The forward ends 52 of the arms 50' are then aligned with the flag portions 60 of the second apertures 58 at the position shown as arm 50". The arms 50" are then elastically deformed over the second stops 66 until the forward ends 52" are forward of the horn bracket 24. The arms 50" are then pushed outwardly away from one another until they snap past the second stops 66, where they will then return toward their undeformed shape (shown as arms 50), thereby moving the ends 52" of the arms 50" away from the flag portions 60 of the second apertures 58. The arms 50 may abut or bear against the first stops 64, which keep the spring 26 centered in the proper position relative to the holes 46. The spring 26 is thus retained on the horn bracket 24. The second stops 66 prevent the arms 50 from being deformed back to position where the ends 52 can pass through the flag portions 60 of the second apertures 58. Although the spring 26 could be removed from the horn bracket 24, it will not fall out during shipping or before assembly into the steering wheel assembly 10 of FIG. 1.

Figure 4:
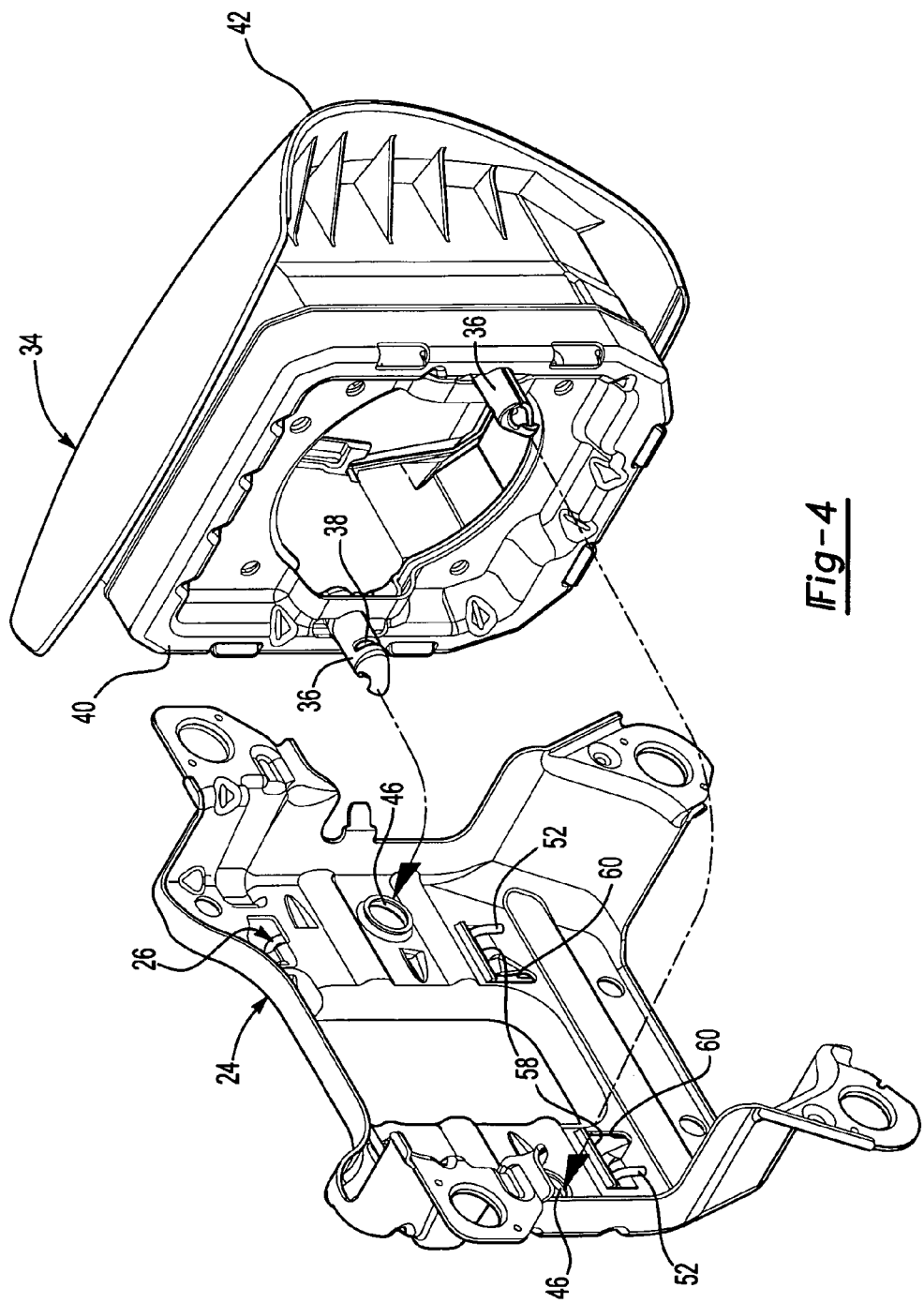
FIG. 4 is a perspective view showing the assembly of the airbag module to the horn bracket assembly of FIG. 3.

FIG. 4 is a perspective view showing the assembly of the airbag module 34 to the horn bracket 24. The airbag module 34 is connected to the horn bracket 24 by inserting the connection pins 36 into the holes 46, such that the arms 50 of the spring 26 snap into the slots 38 of the connection pins 36.

FIG. 5A is a view, similar to FIG. 3A, showing the first step of inserting a connection pin 36 into the horn bracket 24. As shown, the arm 50 of the spring 26 extends across the hole 46. As the connection pin 36 is inserted, each arm 50 is deformed inwardly (toward one another) to the position shown as arm 50 in FIG. 5B. As shown as arm 50', the second stop 66 prevents the arm 50' from being deformed to where the end 52' can pass through the flag portion 60 of the second aperture 58. Once the connection pin 36 is sufficiently inserted into the hole 46, the arm 50 snaps back outwardly into the slot 38 formed in the connection pin 36. FIG. 6 is a section view taken along line 6-6 of FIG. 5C. As can be seen in FIG. 6, the arm 50 of the spring 26 prevents the connection pin 36 from being removed from the horn bracket 24.

The horn bracket 24 and spring 26 assembly of the present invention provide attachment of the spring 26 to the horn bracket 24 without need for separate fasteners or additional pieces. It should be noted that the bias of the spring 26 could alternatively be reversed, such that the spring 26 is biased inwardly during installation and outwardly during insertion of the connection pin 36, in which case the flag portions 60 would be on the outer portions of the second apertures 58 and the first and second stops 64, 66 would be appropriately reversed. Also, although shown installed on a horn bracket 24, the spring 26 could be installed on a different bracket in a different configuration of the steering wheel assembly 10.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. Alphanumeric identifiers on method steps are for convenient reference in dependent claims and do not signify a required sequence of performance unless otherwise indicated in the claims.

What is claimed is:

1. An assembly for retaining an airbag assembly in a steering wheel assembly comprising:
   a U-shaped spring having a pair of arms, each with a free end, and a cross bar, the cross-bar connecting first ends of the two arms; and
   a bracket having a pair of first apertures, a pair of second apertures and a pair of holes for receiving a connection pin, each of the second apertures including a portion of increased dimension through which the free ends of the arms can be inserted and a portion of reduced dimension which retains the free ends of the arms,
   each of the pair of arms having a first portion of the spring extending through a different one of the first apertures and a second portion of the spring extending through the portion of reduced dimension of a different one of the second apertures to retain itself to the bracket, a third portion of each arm of the spring extending across one of the holes, the third portion of each of the arms of the spring between the first portion and the second portion.

2. The assembly of claim 1 wherein the bracket is a horn bracket.

3. The assembly of claim 2 wherein the horn bracket is a stamped metal sheet.

4. The assembly of claim 1 wherein the second apertures each include the portion of increased dimension through which free ends of the arms can be inserted and the portion of reduced dimension which retain the free ends of the arms.

5. The assembly of claim 4 further including a pair of first stops integral with the bracket for preventing the arms from returning to the portions of increased dimension after the spring is retained on the bracket.

6. The assembly of claim 1 wherein each arm includes an offset free end extending through one of the pair of second apertures.

7. The assembly of claim 1 wherein the hole is one of a pair of holes for receiving connection pins of the airbag assembly, the arms of the spring extending over the holes.

8. The assembly of claim 7 wherein the bracket further includes a pair of stops opposing movement of the arms away from the holes.

9. A steering wheel assembly including the assembly of claim 7 and further including an airbag assembly having a pair of connection pins extending through the holes, the connection pins retained to the bracket by the arms of the spring.

10. A horn bracket and inflator housing assembly comprising:
    a horn bracket having a pair of first apertures and a pair of second apertures, the pair of second apertures each including a portion of increased dimension and a portion of reduced dimension, the bracket further including a pair of holes extending from an interior side of the horn bracket to an exterior side of the horn bracket;
    a U-shaped spring having a pair of arms extending from a cross bar portion, each arm extending through one of the pair of first apertures and one of the pair of second apertures, such that the cross bar portion is on a first side of the horn bracket and at least one of the pair of arms is on a second side of the horn bracket, wherein the first side of the horn bracket is either the interior side of the bracket or the exterior side of the bracket, and wherein the second side of the horn bracket is opposite the first side, each arm extending over one of the holes; and
    an inflator housing having a pair of connection pins, each having a slot, each arm of the spring received in one of the slots to connect the inflator housing to the horn bracket.

11. The horn bracket and inflator housing assembly of claim 10 wherein the horn bracket includes a pair of integral first stops for preventing the arms from returning to the portions of increased dimension after the spring is retained on the horn bracket.

12. The horn bracket and inflator housing assembly of claim 11 further including a pair of integral second stops, the pair of arms of the spring between the pair of integral second stops.

13. The horn bracket and inflator housing assembly of claim 10 wherein each arm includes an offset free end extending through one of the pair of second apertures.

14. The horn bracket and inflator housing assembly of claim 10 wherein the portions of increased dimension are positioned inward of the portions of reduced dimension.

15. A method for assembling a steering wheel assembly including the steps of:

a) inserting arms of a spring through a pair of first apertures through a bracket of the steering wheel;

b) deforming the arms toward one another while inserting the arms through a pair of second apertures through the bracket, and then releasing the arms to move away from one another such that the spring is retained on the bracket and such that the arms each extend across a hole through the bracket for receiving a connection pin of an airbag assembly, the first apertures the second apertures and the holes each extending from an interior side of the bracket to an exterior side of the bracket; and c) inserting the connection pins of an airbag assembly through the holes through the bracket thereby deforming the arms.

16. The method of claim 15 further including the step of, after said step c), snapping the arms into slots on the connection pins to retain the bracket to the airbag assembly with the spring.

17. The method of claim 16 wherein the spring is retained on the bracket solely by the spring and bracket without the use of separate fasteners.

18. The method of claim 15 wherein said step b) is performed after said step a).

19. The method of claim 18 wherein said step b) further includes the step of deforming the spring and inserting a free end of each arm through a first portion of each of the second apertures the arms of the spring moving to second portions of the second apertures where the arms are retained to the bracket.

20. An assembly for retaining an airbag assembly in a steering wheel assembly comprising:

a spring having an arm with a free end; and a bracket having a first aperture, a second aperture and a hole for receiving a connection pin, the second aperture including a portion of increased dimension through which the free end of the arm can be inserted and a portion of reduced dimension which retains the free end of the arm, the bracket including an integral first stop, the spring extending through the first aperture and through the portion of reduced dimension of the second aperture to retain itself to the bracket, the spring extending across the hole, the integral first stop preventing the arm from returning to the portion of increased dimension after the spring is retained on the bracket.

21. The assembly of claim 20 wherein the first aperture is one of a pair of first apertures and the second aperture is one of a pair of second apertures, the spring includes a pair of arms, each arm inserted though a different one of the pair of first apertures and through a different one of the pair of second apertures, wherein the spring is U-shaped and includes a cross-bar connecting first ends of the two arms.

* * * * *